Dec. 9, 1924.  1,518,841
A. DITTO
STONE CUTTING MACHINE
Filed Aug. 5, 1920
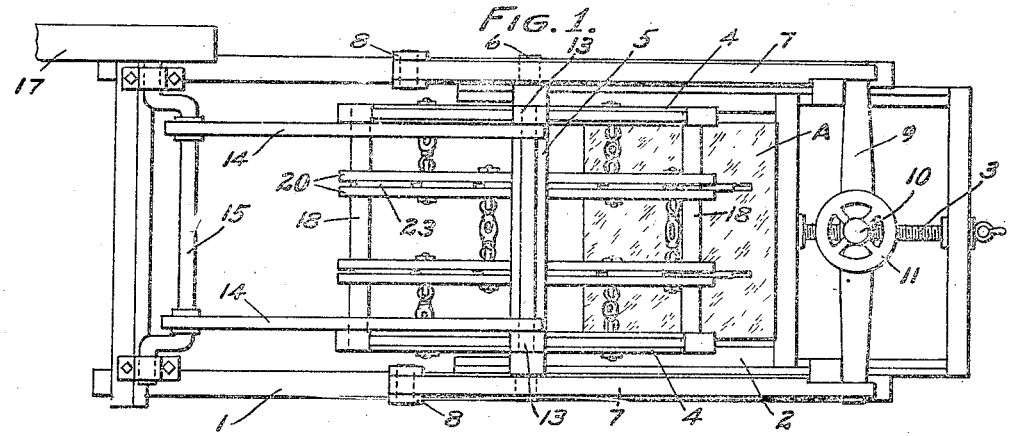
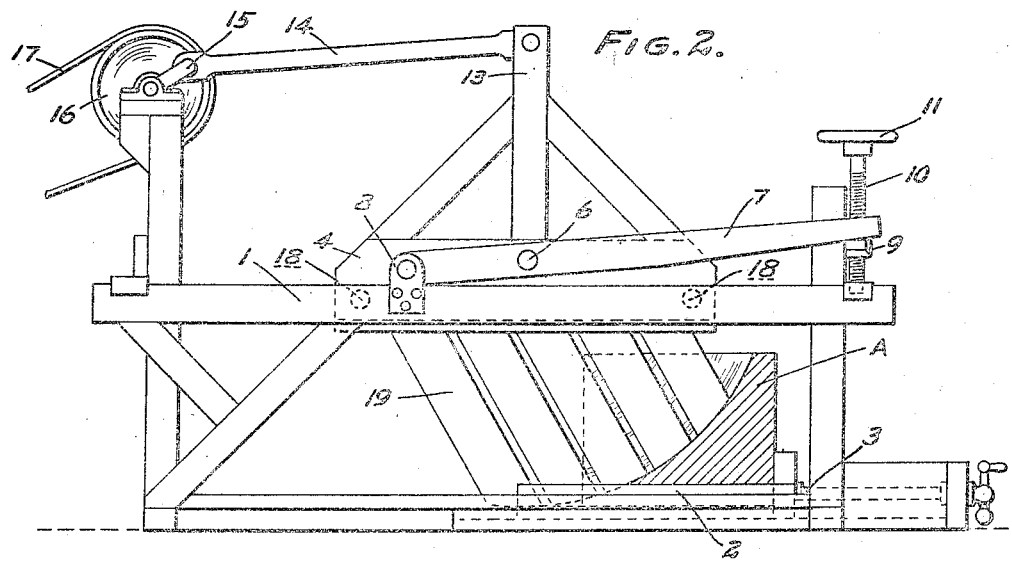
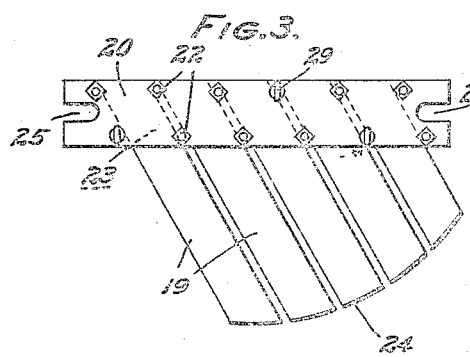
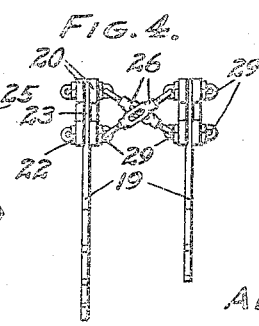
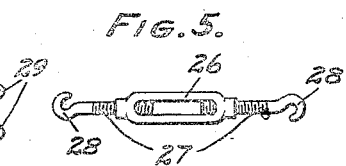
INVENTOR
ALFONSO DITTO
BY
*Hazard & Miller*
ATTORNEYS.

Patented Dec. 9, 1924.

1,518,841

UNITED STATES PATENT OFFICE.

ALFONZO DITTO, OF LOS ANGELES, CALIFORNIA, ASSIGNOR OF ONE-HALF TO VENTURA BERNARDO, OF MONROVIA, CALIFORNIA.

STONE-CUTTING MACHINE.

Application filed August 5, 1920. Serial No. 401,505.

*To all whom it may concern:*

Be it known that I, ALFONZO DITTO, a subject of the King of Italy, residing at Los Angeles, in the county of Los Angeles and State of California, have invented new and useful Improvements in Stone-Cutting Machines, of which the following is a specification.

This invention relates to stone cutting machines and has for its object the provision of a construction including a plurality of cutters arranged for oscillatory movement and positioned in spaced relation alongside one another so that a plurality of cuts may be simultaneously made.

The invention will be readily understood from the following description of the accompanying drawings, in which Figure 1 is a plan view of the machine constructed in accordance with the invention.

Fig. 2 is a side elevation of the same.

Fig. 3 is a detail side elevation of one of the cutters and the mounting for the same.

Fig. 4 is an end elevation showing the connection between adjacent cutters.

Fig. 5 is a side elevation of one of the connections provided between cutters of the machine.

The stone cutting machine includes a standard or any preferred frame 1 having a support 2 for the block of stone A which is to be cut. The support is adjustable in usual manner by means of the screw rod 3. The cutters of the machine are mounted in a frame arranged for oscillatory movement. This frame includes side bars 4 connected by the cross bar 5. A journal shaft 6 extends through the cross bar 5 and is pivotally supported in side arms 7 which are pivotally mounted at one of their ends to the frame 1 as by the bearing brackets 8. The opposite ends of side arms 7 are, preferably, connected by a cross brace 9 through which extends an adjusting screw 10 provided with a hand wheel 11. The parts are so arranged that rotation of the end wheel in opposite directions will raise or lower the side arms 7 for adjusting the pivot of the frame carrying the cutters.

Uprights 13 project beyond cross bar 5 and are connected by links 14 to the throw of a crank 15 suitably journaled upon main frame 1 and arranged to be rotated by a driving connection including a pulley 16 and a belting 17. By this arrangement the drive connection for the machine is arranged to oscillate the cutter frame upon the shaft 6.

The mounting for the cutters within the cutter frame includes rods 18 connecting side bars 4 at their respective ends. Each of the cutters consists of a plurality of blades 19 mounted between side plates 20. The side plates are provided with suitable alined openings through which are received bolts 22 arranged to clamp the shanks 23 of blades 19 between the side plates.

The plurality of blades forming a cutter are arranged to form a continuous curved cutting edge 24. The side plates 20 supporting a cutter are mounted upon rods 18 as by means of slots 25 provided in the ends of the side plates. In practice one or more of the cutters is arranged in the cutter frame, suitable connecting braces being provided between the respective cutters when more than one is employed, and similar brace connections being also provided between the cutters and the side bars 4. These bracing connections are shown as turnbuckles 26 having the oppositely extending threaded shanks 27 arranged to be longitudinally adjusted relative to one another by means of said turnbuckles. The shanks 27, preferably, terminate in hooks 28 adapted to engage eye bolts 29 replacing the usual bolts 22 employed for connecting side plates 20 of a cutter. Similar eye bolts are also provided upon side bars 4 to engage the braces provided between said side bars and the cutters.

In practice the bracing connections are crossed or angularly disposed relative to one another, as clearly shown in Fig. 4, in order to form rigid braces in all directions for the individual cutters.

It will be observed that the construction as thus provided forms ready means whereby a plurality of cutters may be employed in a stone cutting machine, said cutters being positively braced relative to one another as well as with relation to the cutter frame.

Various changes may be made without departing from the spirit of the invention as claimed.

What is claimed is:

1. A stone cutting machine including a movable frame, a cutter in said frame, and transverse adjustable braces crossed between said cutter and said frame for positioning said cutter relatively to said movable frame.

2. A stone cutting machine including a movable frame, a plurality of cutters in spaced relation alongside one another in said frame, and transverse adjustable braces crossed between said cutters for positioning the latter.

3. A stone cutting machine including a movable frame, a plurality of cutters in spaced relation alongside one another in said frame, and transverse braces crossed adjustable between said cutters and between the end cutters and said frame for positioning said cutters.

4. A stone cutting machine including a movable frame, a cutter in said frame, transverse braces crossed between said cutter and said frame, and means for adjusting the lengths of said braces for positioning said cutter relatively to said movable frame.

5. A stone cutting machine including a movable frame, side plates in said frame, a cutter clamped between said side plates, and transverse braces crossed between said side plates and said frame for positioning said cutter relatively to said movable frame.

6. A stone cutting machine including a movable frame, said frame having transverse end members, side plates removably mounted in said frame upon said end members, cutters clamped between pairs of said side plates, and transverse adjustable braces between adjacent side plates of said pairs and between said side plates and said frame for positioning said cutters.

7. In a stone cutting machine, parallel series of plates spaced in longitudinal arrangement by retaining bolts extending between said plates and through parallel plates at opposite sides thereof, and crossed braces adjustably connecting said parallel plates.

8. In a stone cutting machine, parallel series of plates spaced in longitudinal arrangement by retaining bolts extending between said plates and through parallel plates at opposite sides thereof, and crossed braces adjustably connecting said parallel plates, said crossed braces being secured to said retaining bolts.

In testimony whereof I have signed my name to this specification.

ALFONZO DITTO.